United States Patent Office 3,358,204
Patented Dec. 12, 1967

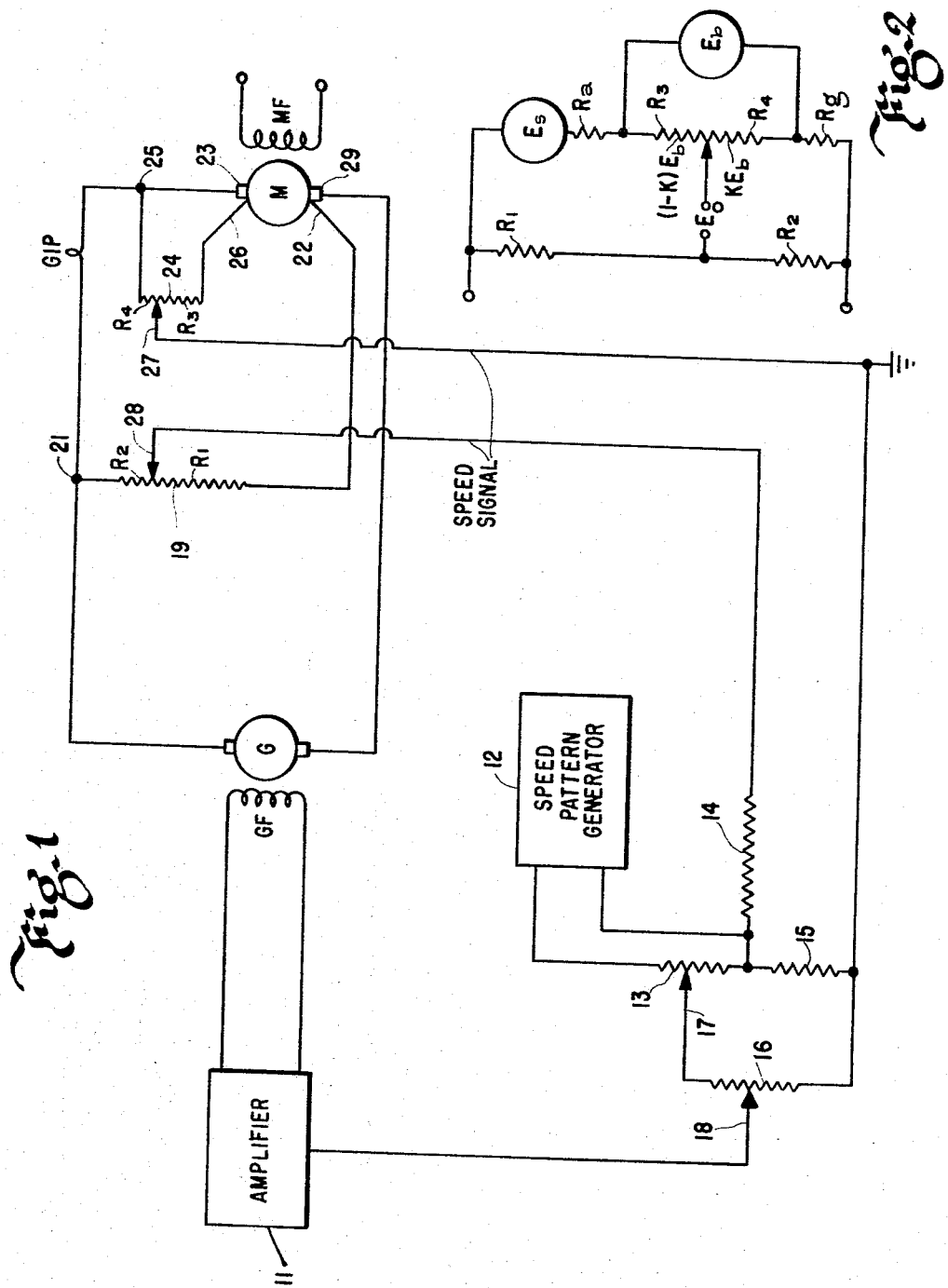

3,358,204
COMPENSATED COUNTER E.M.F.
SPEED CONTROL
Robert O. Bradley, Toledo, Ohio, assignor to Toledo Scale Corporation, Toledo, Ohio, a corporation of Ohio
Filed May 19, 1964, Ser. No. 368,623
6 Claims. (Cl. 318—331)

This invention relates to electric motors and more particularly to means for ascertaining the true speed of such motors from the back electromotive force developed across their armatures.

Heretofore it has been well known that the speed of an electric motor is a function of the electromotive force generated therein. However, a pure electromotive force signal has not been attainable due to the inherent inclusion of brush drop and the effects of armature current at the motor armature in any signal available. Brush drop is a particularly difficult factor to compensate since it is non-linear. That is, for example, in a D.C. shunt motor of 240 volts and 143 amperes full load a generally linear brush drop is experienced up to about 50 amperes resulting in about 2 volts drop at 50 amperes and thereafter the drop remains at about that level. Even this value of brush drop is not constant but varies with temperature, the condition of the commutator surface, and speed. In those systems where a speed signal is derived from the motor, techniques have been employed to compensate for brush drop and armature current effects. These have included combining the back E.M.F. of the motor with a differentially related potential drop taken across a resistor in series with the armature. Such arrangements have not precisely compensated the nonlinearity of the brush drop. Alternatively, tachometer generators have been employed to generate a speed signal.

An object of the present invention is to increase the accuracy of the speed signal derived from an electric motor.

Another object is to reduce the expense of deriving an accurate speed signal from an electric motor.

A third object is to eliminate the brush drop and armature current effects from the E.M.F. generated by an electric motor.

In accordance with the above objects, one feature of this invention resides in developing a back E.M.F. signal in a bridge circuit in which the brush drop and armature current effects have been balanced out. This elimination of the brush drop is achieved by bridging the unknown brush drop with a resistance which is divided to apply a resistance on opposite sides of a tap from which the motor E.M.F. is derived in the same proportion as an unbridged resistance in series with the brush whereby the unknown potential drop across the brush is proportionally divided between the potentials which are utilized in developing the speed signal.

The above and additional objects and features of this invention will be more fully appreciated from the following detailed description when read with reference to the accompanying drawing wherein:

FIG. 1 is a schematic diagram of a variable voltage, direct current motor control having a velocity feedback control employ an E.M.F. or speed signal derived according to this invention; and FIG. 2 is an equivalent circuit of the portion of the circuit from which the speed signal is obtained.

Motor M of FIG. 1 is of the direct current shunt field type having a shunt field MF supplied from a constant source of direct current. The motor is controlled by altering the armature current and voltage in the well known variable voltage or Ward-Leonard type of system from a direct current generator G having an armature driven at a constant speed by means not shown, and having a shunt field GF which is controlled to establish the motor speed. Generator G also has interpole windings GIP in series with its armature. The loading of the motor may be either hauling or overhauling wherein it becomes a generator feeding current back to the current supply.

As employed in one application, to control the lifting motor of an elevator, the generator shunt field is controlled from an amplifier 11, which receives an input as an error signal developed by comparing a pattern speed signal with the actual speed of the motor M. In practice the pattern speed signal can be generated by the speed signal generator 12 in a number of ways. For example the speed signal can be based upon the time which has elapsed from the issuance of a start signal to the elevator car so that a time vs. velocity pattern is developed across resistor 13 or it can be based upon the position of the car, particularly the distance from its point of starting during the interval it accelerates to full speed or the distance to its next stopping point when decelerating so that a position vs. velocity pattern is developed across resistor 13. One such position vs. velocity pattern generating means is shown in United States patent application Ser. No. 343,-301 entitled "Elevator Control" filed Feb. 7, 1964 in the names of Robert O. Bradley and Paul F. De Lamater. The motor speed signal is applied through a series resistor 14 and across resistor 15 so that it is compared with the pattern signal through the differential relationship of the signals on rheostat 16. Adjustable tap 17 enables a proper relationship to be established between the potentials from the speed pattern signal and the actual speed signal so that the operation of the elevator motor at the speed dictated by the pattern results in no error signal and tap 18 receives only the signal necessary for the amplifier 11 to sustain the motor speed.

The actual speed signal is derived from the E.M.F. generated by the motor M. It is obtained in a manner to eliminate the effects of the motor armature current and the motor brush drop from the signal developed across the motor armature. Pilot brushes are employed across the motor armature. These brushes may be a pair of brushes supported on the main brush holders for the motor and isolated from the motor-generator armature loop current. Successful results have also been achieved by employing one pair of main brushes of a multipole motor as pilot brushes by disconnecting them from the motor-generator armature loop.

A pair of bridges are arranged to provide the desired signal by connecting an adjustably tapped resistance 19 from junction 21 between the generator brush or output terminal of a corresponding controlled source of unidirectional current and generator interpole winding GIP or a suitable resistance and a pilot brush 22 on the opposite side of the motor armature. Thus resistance 19 is connected across the generator interpole windings GIP or a corresponding resistance, the motor brush 23 and the motor armature. The second resistance 24 is connected across the motor brush 23 encompassed by the first bridge as from junction 25 to pilot brush 26. Brush drop as at brush 23 is an unknown non linear value; however as will be shown below it can be balanced out of the signal representative of the speed E.M.F. of the motor by dividing it proportionally between the drop across the innerpole windings GIP and the motor armature through the adjustment of tap 27 on resistance 24. A tap 28 is positioned on resistance 19 to establish a similar proportion whereby the voltage between the taps 27 and 28 is proportional only to the E.M.F. generated by the motor M. Thus, if the resistance $R_g$ of the interpole windings GIP has a given value, e.g. 0.0335 ohm, and the motor armature resistance $R_a$ is of a given value, e.g. 0.079 ohm, then the proportions of resistances $R_1$ and $R_2$ of resistance 19 between junction 21 and tap 28 and tap 28 and the armature at pilot brush 22 respectively should be the same, and the proportions of resistances $R_3$ and $R_4$ of resistance 24 between junction 25 and tap 27 and between tap 27 and the armature at pilot brush 26 should be the same so that:

$$\frac{R_a}{R_g} = \frac{R_1}{R_2} = \frac{R_3}{R_4}$$

Under these conditions the voltage between taps 27 and 28 will be proportional to the motor E.M.F., and the voltage at those taps will be independent of the current flowing in the motor armature and of the drop across the main brushes of the motor. This will be appreciated from a consideration of the equivalent circuit of FIG. 2.

In FIG. 2 $E_s$ represents the speed voltage E.M.F. of the motor, $E_b$ represents the voltage drop across the brush which may be considered a voltage generator with no internal resistance, $KE_b$ is the voltage from grounded tap 27 to the junction 25, and $(1-K)E_b$ is the voltage from grounded tap 27 to the commutator bars of the motor armature. The output voltage $E_0$ across taps 27 and 28 for armature current $I_a$ then is:

$$E_0 = \frac{R_2}{R_1+R_2}[E_s + E_b + (R_a + R_g)I_a] - I_a R_g - KE_b$$

$$= \frac{E_s R_2}{R_1+R_2} + \frac{E_b R_2}{R_1+R_2} + \frac{(I_a + R_g)R_2 I_a}{R_1+R_2} - R_g I_a - KE_b$$

Thus $E_0$ is the algebraic sum of voltage proportional to the generated electromotive force in the motor $E_s$, the voltage drop in the brush $E_b$, the voltage drop in the interpole winding or external resistance $I_a R_g$, and the voltage drop in the armature $I_a R_a$; and a voltage proportional to the resistance drop in said armature $I_a R_g$ (while this is the drop in the external resistance it is proportional to the drop in the armature. $I_a R_a$, in the ratio of $R_a/R_g$) and a portion of the voltage drop across the brush, $KE_b$, corresponding to the relation said external resistance, $R_g$, bears to the armature resistance, $R_a$.

To render $E_0$ independent of $I_a$ the sum of the $I_a$ terms above must equal zero, or:

$$\frac{(R_a + R_g)R_2}{R_1+R_2} - R_g = 0$$

$$R_a R_2 + R_g R_2 = R_1 R_g + R_2 R_g$$

$$R_a R_2 = R_1 R_g$$

or $$\frac{R_a}{R_g} = \frac{R_1}{R_2}$$

Thus tap 28 should be set so that resistance 19 is divided in the above proportion to eliminate the effect of armature current on the output voltage.

To render $E_0$ independent of $E_b$ the sum of the $E_b$ terms above must equal zero, or:

$$\frac{E_b R_2}{R_1+R_2} - KE_b = 0$$

$$K = \frac{R_2}{R_1+R_2}$$

$$KR_1 + KR_2 = R_2$$

$$KR_1 = (1-K)R_2$$

$$\frac{R_1}{R_2} = \frac{1-K}{K}$$

since $$\frac{1-K}{K} = \frac{R_3}{R_4}$$

then $$\frac{R_a}{R_g} = \frac{R_1}{R_2} = \frac{R_3}{R_4}$$

under the assumed conditions. Under these conditions the initial equation reduces to $$E_0 = \frac{E_s R_2}{R_1+R_2}$$

and the output voltage is a function of the counter E.M.F. in the proportion of $$\frac{R_2}{R_1+R_2} \text{ or } \frac{R_g}{R_a+R_g}$$

It is desirable in the illustrated circuit of the motor-generator armature loop to avoid any ground except at the tap 27. Further the current drawn at tap 28 should be minimized. In practice this has been accomplished by employing a resistance 19 of ten thousand ohms and by applying the signal to a high impedance input of the control for the generator unidirectional current source. In the above mentioned system resistance 19 has been of ten thousand ohms, and the matching of the speed and pattern signals has been accomplished with resistance 15 of four hundred seventy ohms, resistance 13 of one hundred ohms and resistance 16 of two thousand ohms. Resistance 24 can be of one hundred ohms in this system.

The above values of circuit parameters are merely illustrative of those employed in one embodiment of the invention and should not be read in a limiting sense. Other values will be equally effective since the balancing achieved enables elimination of the undesired voltages without regard to the magnitudes of resistances employed.

While the high closed loop gain which has been employed in the systems embodying the speed signal source of this invention have dictated an elimination of virtually all effect of armature current on the signal, e.g. with closed loop gains of 50 to 100:1, not all applications require this precision. In some instances a significant improvement can be achieved by the use of the main brush 29 in place of pilot brush 22 as the point of connection for resistance 19. While this arrangement eliminates the effect of but one brush and leaves the brush drop of the other brush in the circuit, it offers substantial improvement over prior techniques involving corresponding expense.

The exemplary system has been applied to the control of elevator lifting motors wherein the inertia of the load has been of such a magnitude as to swamp out any significant effects attributable to the inductance of the motor armature. Where low inertia loads are driven by the motor, the inductance of the armature can become significant with respect to the speed signal developed at taps 27 and 28, particularly where rapid changes in speed are required. The inductance of the generator interpole winding GIP providing the external resistance in part compensates for the inductive effects of the motor armature and hence, when a relatively pure resistance is employed for the external resistance, the motor armature inductance can have a significant effect upon the speed signal at taps 27 and 28. These adverse effects of motor armature inductance can be compensated to an appreciable degree by the inclusion of a capacitance across the resistance $R_2$ of FIG. 1 whereby at least a portion of the high frequency signal is passed around resistance $R_2$. This enables the potential on $R_1$ to more nearly balance that across the motor armature at these frequencies of current change.

The above description has been confined to a Ward-Leonard type of system. Other forms of control of the armature current to a direct current motor are known. In such systems the motor generated E.M.F. producing a proportional speed signal independent of armature current and brush drop can be achieved according to this invention by substituting a low resistance in series with the motor armature and the source in the relationship of the generator interpole winding as shown in FIG. 1 or $R_g$ as shown in FIG. 2. In such a situation it is advantageous to employ a resistance which is low with respect to the motor armature resistance, for example in a ratio of the order of 1:10.

Having described the invention, I claim:

1. A combination for producing an electrical signal which is a function of the speed of a direct current motor comprising, an armature for said motor having a resistance; a source of electrical energy for said armatue; a first resistance in series between said motor armature and said source of electrical energy; second and third resistances connected in series across said first resistance and said motor armature; a main brush to said motor connected between said first resistance and said armature; fourth and fifth resistances connected in series between said first resistance and said armature resistance across said main brush, said second resistance being related to said third resistance and said fourth resistance being related to said fifth resistance in the same proportion as said first resistance is related to said resistance of said motor armature; and a tap from between each of said second and third resistances and said fourth and fifth resistances to provide said electrical signal representative of motor speed.

2. A combination for producing an electrical signal which is a function of the speed of a direct current motor comprising an armature for said motor having a resistance, a source of electrical energy for said armature, a first resistance in series between said motor armature and said source of electrical energy, second and third resistances connected in series across said first resistance and said motor armature, a main brush for said motor connected between said first resistance and said armature, a pilot brush for said armature connected at essentially the same potential as said main brush, fourth and fifth resistances connected in series between said first resistance and said armature resistance across said main brush to said pilot brush, said second resistance being related to said third resistance and said fourth resistance being related to said fifth resistance in the same proportion as said first resistance is related to said resistance of said motor armature, and a tap from between each of said second and third resistances and said fourth and fifth resistances to provide said electrical signal representative of motor speed.

3. A combination for producing an electrical signal which is a function of the speed of a direct current motor comprising an armature for said motor having a resistance, a source of electrical energy for said armature, a first resistance in series between said motor armature and said source of electrical energy, a first and second main brush connecting said armature to said source, a first and second pilot brush, said first pilot brush being at essentially the same potential as said first main brush and said second pilot brush being at essentially the same potential as said second main brush, second and third resistances connected in series across said first resistance and said motor armature to said second pilot brush, said first main brush for said motor being connected between said first resistance and said armature, fourth and fifth resistances connected in series between said first resistance and said armature resistance across said main brush to said second pilot brush, said second resistance being related to said third resistance and said fourth resistance being related to said fifth resistance in the same proportion as said first resistance is related to said resistance of said motor armature, and a tap from between each of said second and third resistances and said fourth and fifth resistances to provide said electrical signal representative of motor speed.

4. A combination according to claim 1 wherein said source is a dynamo electric direct current generator and said first resistance is an interpole winding of said generator.

5. A combination according to claim 1 wherein said second and third resistances are at least of the order of a hundred times the resistance of said first and armature resistances.

6. A motor control comprising a direct current motor, an armature for said motor having a resistance, a source of unidirectional current for said armature, a first resistance between said source and said armature, a first resistance between said source and said armature, second and third resistances connected in series across said first resistance and said armature, a brush carrying the principal current to said armature connected between said first resistance and said armature, fourth and fifth resistances connected in series across said brush, said second and third resistances and said fourth and fifth resistances being related to each other in the same proportion as said first and armature resistances, a control for said source, a high impedance input for said control, and connections to said input from between each of said second and third resistances and said fourth and fifth resistances.

References Cited

UNITED STATES PATENTS

| | | | |
|---|---|---|---|
| 2,864,989 | 12/1958 | Bradburn et al. | 318—331 |
| 3,181,050 | 4/1965 | Berman | 318—331 |
| 3,229,182 | 1/1966 | Kubler | 318—331 |
| 3,249,840 | 5/1966 | Eriksson et al. | 318—331 |

ORIS L. RADER, *Primary Examiner.*

J. C. BERENZWEIG, J. J. BAKER, *Assistant Examiners.*